United States Patent Office 2,768,114
Patented Oct. 23, 1956

2,768,114

RABIES VACCINES AND METHODS OF PREPARING THE SAME

Hilary Koprowski, Englewood, N. J., and Jack Black, Spring Valley, and Doris J. Nelsen, Congers, N. Y., assignors to The American Cyanamid Company, New York, N. Y., a corporation of Maine No Drawing. Application August 21, 1953, Serial No. 375,807

7 Claims. (Cl. 167—78)

This invention relates to the art of immunizing animals against rabies. More particularly the invention relates to a new means of developing fully attenuated rabies virus and to processes of preparing vaccines therefrom. It also includes the new vaccines thus prepared.

Rabies is a disease known since ancient times and the clinical manifestations, pathology, epidemiology as well as other features of the disease have been well classified and are now well known to those skilled in the art. At the present time rabies is still a serious threat to animals, including man, in many parts of the world and even in the U. S. between the years 1938 and 1945 an average of approximately 8,000 dogs per year were reported to have died of rabies.

For many years attempts have been made to develop a safe and effective vaccine for the prevention of rabies and in fact a great deal of success has been reported in recent years with phenolized or carbolized rabies vaccines. It is, however, well recognized that these vaccines are subject to various shortcomings. In the first place, as with all other killed virus vaccines, the protection obtained with phenolized rabies vaccine is not long lasting and annual vaccination is usually recommended. A second disadvantage of such vaccines is that they are usually prepared from rabbit brain tissues and the use in a vaccine of such tissues can not be considered safe in view of increasing evidence of neuoparalytic accidents following their use. A third disadvantage of such vaccines is their high cost due to the involved procedure necessary for their production.

As would be expected in view of the disadvantages and limitations of killed virus rabies vaccines, numerous attempts have been made to develop a truly attenuated safe live virus vaccine for rabies. These attempts have, however, met with failure or, at the most, limited success due to the tendency of rabies virus to become fixed in its characteristics after only a relatively few passages in a given host. In other words, when rabies virus is passed serially through a given host, it generally undergoes some measure of attenuation for the first few passages and then reaches a point where further serial passages do not alter the characteristics of the virus to any great degree. As an example, strains of virus obtained from Pasteur and adapted to grow in rabbits have been passed through rabbits for over 2,000 serial passages without materially altering the characteristics of the original Pasteur strain. In spite of the general tendency of rabies virus to become fixed after only a few serial passages, it has been found that a truly attenuated live rabies virus can be obtained and a safe vaccine can be prepared by the new processes of this invention.

The new vaccines of this invention prepared from a fully attenuated rabies virus overcome many of the disadvantages and limitations of the killed virus rabies vaccines of the prior art. The new vaccines of this invention are relatively inexpensive, result in a relatively long lasting immunity and are substantially free of central nervous tissues so that no difficulty is experienced with neuroparalytic reactions. The new vaccines of this invention have the additional advantage that the procedure of manufacture is greatly simplified due primarily to the fact that the virus employed in the preparation of the vaccines is propagated in egg embryos as contrasted to the prior art use of rabbits. When an animal such as a rabbit is employed for the growth of virus to be employed in vaccines, the animal must first be inspected by a veterinarian, quarantined for a period of time, tested for tuberculosis and other diseases in many instances, and then treated with antibiotics or other chemotherapeutic materials to insure freedom of bacterial infection. In addition the area to be inoculated must be shaved, washed and sterilized. In contrast to this involved procedure, the only steps required for inoculating an egg embryo are first to make certain that the eggs are free of S. pullorum and then to candle the egg and drill a small opening in a selected spot for the injection of seed virus. A still further advantage of egg embryo produced vaccines is that fewer undesirable allergic manifestations are encountered in the use of vaccines prepared from egg embryos than from any other material.

The most important advantage of the new vaccines of this invention is, however, that the degree of attenuation of the virus is so great that they can be employed with almost complete safety. In the past, partially attenuated live virus vaccines have been employed for the prevention of neurotropic diseases, especially in domestic animals, even though the degree of attenuation was such that if the vaccine materials were injected intracerebrally, paralysis or even death might occur. This appears to be possible only because the animal body produces sufficient antibodies, when injected intramuscularly or subcutaneously, before the live virus has an opportunity to become established in the nervous system. So long, however, as there is the possibility that the virus might enter the nervous system, before the antibody titer has reached a sufficiently high level, and cause possible paralysis or death, the vaccine can not be considered entirely safe. The new vaccines of the invention are so completely attenuated that even when injected directly into the brain tissues of several types of animals known to be unusually susceptible to rabies, no serious ill effects were observable. It can be seen that this is both a real advantage and a psychological advantage and opens the door to the future use of the vaccine in any instance where immunization against rabies is deemed desirable.

According to the new method of this invention an attenuated live rabies virus is obtained by the steps which comprise inoculating incubating eggs at any site, preferably the yoke sac or allantoic sac, after a five to nine day incubation period with rabies virus, harvesting the virus from the chick embryo from five to twelve days after inoculation, employing the thus harvested virus to inoculate a second five to nine day old chick embryo and continuing the serial passage of the rabies virus until at least one hundred and fifty passages in chick embryos have been completed. After approximately one hundred fifty to two hundred passages in chick embryos, it has been found that the rabies virus undergoes a marked and rapid change in pathogenic properties so that it becomes avirulent even for fourteen day old mice when injected intracerebrally. Mice are well known to be among the most susceptible of animals to rabies and it is believed that this is the first instance of an attenuated virus material which can be injected intracerebrally in high concentrations without causing death. It is even more surprising, however, that the virus material maintains the same antigenicity as virus that has only undergone a few egg passages. In other words the attenuated virus materials of this invention give an excellent immunological response even though they have lost their ability to induce typical rabies when injected intracerebrally.

Almost any available strain of virus can be employed in the new process of this invention. Unlike many other viruses, very little difficulty is encountered in inducing almost any strain of rabies virus to grow in egg embryos. Practically any strain of rabies virus can be grown in this host by a few alternating passages from egg embryo to mouse or other host and back to the egg embryo and with most strains of rabies virus such alternating passages are not necessary and the virus will readily adapt itself to grow in the egg embryo after a few serial passages. It is therefore possible to employ street virus in the production of the new vaccines of this invention although it is often advantageous to employ a strain of virus which has been "fixed" by serial passages in an animal host.

When street virus is passed serially through such animals as rabbits or guinea pigs, the virus at first undergoes rapid changes so that the period of incubation is materially shortened, the ineffective titer increased and other changes take place. However, after a number of passages, generally from about twenty to eighty, the strain becomes relatively fixed in its characteristics so that further passages do not appreciably alter the nature of the virus. There are many strains of fixed virus that are available today and substantially all are suitable for use in the preparation of the new vaccines of this invention. While, however, any of these strains of fixed virus may be employed in the new process of this invention, it is usually advantageous to select a strain which is known to have a low pathogenicity and one which is known to give a high immunological response.

The Flury strain of fixed virus is an excellent one for use in the new process of this invention. This strain of virus was originally isolated and fixed by serial passage in the brain tissues of baby chicks. It is available at the Rockefeller Foundation, New York city. Its properties make it especially suitable for use in the new process of this invention. For example the strain shows a low pathogenicity for rabbits as determined by intracerebral inoculation at the 50th egg passage and while the virus results in fatal rabies if injected intracerebrally in dogs, the salivary glands of the afflicted animals remain free of virus. In spite of these relatively mild characteristics, the Flury strain of virus gives a high immunological response when compared to other strains of fixed rabies virus.

The Flury strain of rabies virus can be carried serially through chick embryos without the necessity of alternating passages; however, it has been noted that there is a noticeable drop in the LD 50 titer for baby chickens and mice during the early egg passages. After about the tenth to fifteenth passage the LD 50 titer of the virus for both chickens and mice will be found to be at a reasonably high level and to remain relatively constant through succeeding passages until a marked change is noticed at about the one hundred and fiftieth to two hundredth egg passage. At this point the pathogenicity of the strain for mice as well as other animals becomes markedly less so that fourteen day or older mice are not fatally stricken by rabies even on the intracerebral injection of the attenuated virus material.

Although it is preferred that the virus be attenuated by straight serial passage in developing chick embryonic tissue it may be found desirable, for testing purposes or to prepare a pool for storage, to interrupt the serial passages by growing the virus in other hosts such as day old chicks or baby mice. The serial passages may then be resumed in the incubating egg. Hens' eggs are preferred because of their low cost and continual availability but the use of eggs of other birds is not precluded.

In brief, the preferred method of developing the attenuated virus and preparing a vaccine therefrom can be summarized as follows:

Five to nine day embryonated eggs, from pullorum free flocks, are selected and the shell is open at the air sac end with a drill and infected with 0.5 ml. of rabies virus above the 150th passage in eggs at a dilution previously determined by titration in eggs and suckling mice, and calculated to give optimal growth.

The eggs are sealed with collodion ether and incubated at 34° to 36° C. for 7 to 12 days. At the end of the incubation, the eggs are candled and those containing dead embryos are discarded.

The living embryos are harvested under aseptic conditions, triturated as 100% tissue in a mill and diluted to a final tissue concentration of 70%. This suspension is then filtered through gauze so that the filtrate will pass through a 20 gauge needle with ease.

To this filtrate may be added streptomycin to a final concentration of $1000\gamma$ per ml. and penicillin to a concentration of 500 u. per ml. If such antibiotics are added, the suspension is held at $+4°$ C. for two hours and then filled, frozen, and dried. If no antibiotics are added, the suspension may be filled immediately. After drying, the product is tested for moisture, animal safety, and potency.

To illustrate the new process of this invention in greater detail, a chick brain suspension, representing the 136th chick passage of the Flury strain of rabies virus as obtained from the Rockefeller Foundation, was rehydrated and injected intracerebrally into one day old chicks. The birds were sacrificed on the sixth day after inoculation and another passage was made in one day old chicks. These in turn were sacrificed on the sixth day and 0.5 ml. of a ten percent suspension of their brain tissues were inoculated into the yolk sacs of 7 day old embryonated eggs. Six days after the inoculation the embryos were sacrificed and suspensions of the homogenized embryos were prepared. The yolk sacs of 7 day old fertile eggs were then inoculated with a 20 percent embryo suspension in distilled water and 6 days after inoculation the embryos were again sacrificed and homogenized suspensions of the embryo material prepared. This process was repeated for a total of 12 serial passages in 7 day old chick embryos harvesting after the 6th day until a total of 14 serial passages in egg embryos had been completed. On the 15th and succeeding passages, harvesting was done on the 8th to 10th day after inoculation since it was found that better results were obtained by this procedure. After approximately 20 passages the virus appeared to be relatively fixed so that it did not change noticeably through many succeeding passages. During this period the virus remained fully infective when injected directly into the central nervous system of guinea pigs, hamsters and mice and up to and including the 180th passage the virus was found to be fatal to 6 out of 6 mice tested when injected intracerebrally. On the 181st passage a marked and rapid change was observed in the pathogenic properties of the rabies strain and when virus material from the 182nd passage was injected intracerebrally in mice 14 days of age, none of the animals showed any signs of illness and they invariably became immune to subsequent challenge with street virus. The virus maintained these mild characteristics through subsequent passages and appeared to be fully attenuated.

As a check on the reproducibility of results, the experiments above were repeated starting with material from the 170th passage. Again this material was found to be fully virulent when injected intracerebrally in mice as was the 171st and 172nd passage material. Material from the 174th passage was found to be fully avirulent for 14 day mice even when injected intracerebrally, just as was the material from the preceding experiment, and the inoculated mice developed none of the symptoms of rabies.

The experiment above was again repeated starting with 170th passage material. In this case a marked change was noted on the 172nd passage and the 173rd and succeeding passages were found to be fully attenuated and avirulent when injected intracerebrally into the brains of 14 day old chicks.

Subsequent experiments indicate that the change may take place at any time from about the 150th passage to about the 200th passage.

The antigenicity of the virus material has been checked in numerous species of animals including mice, guinea pigs, dogs, cows, and chimpanzees. In each instance the vaccine gave an excellent immunity against subsequent challenge by street virus or was found to stimulate a high antibody response. Chimpanzees were not challenged with street virus in view of the expensive nature of these animals, but the presence of antibodies could clearly be demonstrated.

Numerous tests have been made to determine the antigenicity of the new virus material of this invention in dogs and in each instance excellent results have been obtained. In these experiments each mongrel dog received 5 milliliters of a 20 percent suspension of the rabies material given intramuscularly in the hind leg. In one series of tests involving a total of 44 dogs, 25 selected animals were vaccinated with rabies material, prepared as described above from the 187th egg passage material, and 19 animals were employed as controls. Thirty days after inoculation all animals were challenged with street virus by intra-masseter inoculation with New York city street virus. None of the dogs vaccinated with the new vaccine of this invention developed rabies but 15 of the 19 dogs not receiving the new vaccine of this invention developed furious rabies and died. Many other tests have been run on dogs and in each instance excellent results comparable to the above were obtained.

In comparable tests on guinea pigs which received 0.25 cc. of a given dilution of vaccine injected intramuscularly in the hind leg and challenged with street virus rabies 21 days later. The vaccine gave excellent results. In fact, even when the chick embryo material was used in dilutions of 1 to 20, 1 to 80 and 1 to 320, excellent immunity was obtained and all inoculated animals remained healthy when challenged with street virus in the usual manner. Both 178th and 179th chick embryo passage materials were employed in the above tests and both materials gave equally satisfactory results. On the other hand 10 out of 10 controls were killed when challenged with street virus. In other tests on guinea pings vaccines prepared from 184th and 187th chick embryo passage materials in each instance gave excellent immunity to all of 6 guinea pigs tested, but 8 out of 9 non-vaccinated controls were killed by rabies when challenged. In further tests on guinea pigs with vaccine material prepared from the 19th, 196th and 200th egg passage virus materials, 6 animals were, in each instance, found to be completely protected by the new vaccines of this invention while 6 out of 6 controls died when challenged 21 days later with street rabies virus.

Comparative tests on cows and chimpanzees indicated that the new vaccines of this invention likewise gave excellent immunological responses in these animals. Cows given from 3 to 15 milliliters of a new vaccine of this invention showed excellent immunological response by the presence of serum neutralizing antibodies and also by their ability to survive the challenge of street virus in various dilutions. Chimpanzees also showed an excellent immunological response by the presence of serum neutralizing antibodies 14 days and even longer periods after inoculation with one of the new vaccines of this invention prepared from embryo material from the 194th egg passage of the Flury strain.

We claim:

1. A method of attenuating virulent rabies virus to a non-pathogenic form without substantial loss of its antigenicity which comprises the steps of introducing virulent rabies virus adapted to propagate in incubating fowl embryo tissue into a fertile fowl egg which has been incubated for 5 to 9 days, allowing the virus to grow therein for a period of from 5 to 12 days while continuing the incubation, removing rabies virus particles from said incubating fowl egg and introducing them into another fertile incubating fowl egg as in the first passage, and continuing the incubation, inoculation and incubation of the rabies virus from one fertile incubating fowl egg to another for at least 150 serial passages through fertile incubating fowl eggs and until the virus has lost its pathogenicity.

2. A method of attenuating virulent rabies virus to a non-pathogenic form without substantial loss of its antigenicity which comprises the steps of introducing virulent rabies virus adapted to propagate in incubating fowl embryo tissue into the yolk sac of an incubating fowl embryo which has been incubated for 5 to 9 days, allowing the virus to grow therein for a period of from 5 to 12 days while continuing the incubation, removing rabies virus particles from said incubating fowl egg and introducing them into another fertile incubating fowl egg as in the first passage, and continuing the incubation, inoculation and incubation of the rabies virus from one fertile incubating fowl egg to another for at least 150 serial passages through fertile incubating fowl eggs and until the virus has lost its pathogenicity.

3. A method of attenuating virulent rabies virus to a non-pathogenic form without substantial loss of its antigenicity which comprises the steps of introducing virulent rabies virus adapted to propagate in incubating fowl embryo tissue into the allantoic sac of an incubating fowl embryo which has been incubated for 5 to 9 days, allowing the virus to grow therein for a period of from 5 to 12 days while continuing the incubation, removing rabies virus particles from said incubating fowl egg and introducing them into another fertile incubating fowl egg as in the first passage, and continuing the incubation, inoculation and incubation of the rabies virus from one fertile incubating fowl egg to another for at least 150 serial passages through fertile incubating fowl eggs and until the virus has lost its pathogenicity.

4. A method of preparing a rabies vaccine which comprises the steps of introducing virulent rabies virus adapted to propagate in incubating fowl embryo tissue into a fertile fowl egg which has been incubated for 5 to 9 days, allowing the virus to grow therein for a period of from 5 to 12 days while continuing incubation, removing rabies virus particles from said incubating egg and introducing them into another fertile incubating fowl egg as in the first passage and continuing the incubation, inoculation, and incubation of the rabies virus from one fertile incubating egg to another for at least 150 serial passages through fertile incubating fowl eggs and until the virus has lost its pathogenicity, and thereafter fertile incubating fowl eggs inoculated with the attenuated virus as before and recovering rabies virus particles therefrom and preparing an aqueous suspension of the attenuated rabies virus constituting a live rabies virus vaccine which is non-pathogenic but capable of producing protective antibodies against rabies when injected in rabies-susceptible mammals.

5. A method of preparing a rabies vaccine which comprises the steps of introducing virulent rabies virus of the Flury strain into a fertile hen egg which has been incubated for 5 to 9 days, allowing the virus to grow therein for a period of from 5 to 12 days while continuing incubation, removing rabies virus particles from said incubating egg and introducing them into another fertile incubating hen egg as in the first passage and continuing the incubation, inoculation and incubation of the rabies virus from one fertile incubating egg to another for at least 150 serial passages through fertile incubating hen eggs and until the virus has lost its pathogenicity, and thereafter fertile incubating fowl eggs inoculated with the attenuated virus as before and recovering rabies virus particles therefrom and preparing an aqueous suspension of the attenuated rabies virus constituting a live rabies virus vaccine which is non-pathogenic but capable of producing protective antibodies against rabies when injected in rabies-susceptible mammals.

6. A method of preparing a rabies vaccine which comprises the steps of introducing virulent rabies virus of the Flury strain into a fertile hen egg which has been incubated for 5 to 9 days, allowing the virus to grow therein for a period of from 5 to 12 days while continuing incubation, removing rabies virus particles from said incubating egg and introducing them into another fertile incubating hen egg as in the first passage and continuing the incubation, inoculation and incubation of the rabies virus from one fertile incubating egg to another for at least 150 serial passages through fertile incubating hen eggs and until the virus has lost its pathogenicity, and thereafter fertile incubating fowl eggs inoculated with the attenuated virus as before and recovering fowl embryo tissue and rabies virus particles therefrom and preparing an aqueous suspension of the attenuated rabies virus by grinding the recovered material so that the suspension is capable of passing through a 20-gauge hypodermic needle and thereafter freezing the aqueous suspension and drying it while frozen at reduced pressure.

7. Rabies vaccine capable of stimulating the production of protective antibodies without producing pathological symptoms of rabies when injected in rabies-susceptible mammals, said vaccine comprising an aqueous suspension of fowl embryo tissue and live, non-pathogenic attenuated rabies virus developed by serial passage of a pathogenic strain of rabies virus in incubating fowl tissue in accordance with the proces of claim 4.

References Cited in the file of this patent

Bernkopf et al.: Proc. Soc. Exp. Biol. and Med., 1940, pp. 332–335.

Bernkopf et al.: J. A. P. A., Sci. Ed., October 1942, p. 295.

Beveridge: "The Cultivation of Virus and Rickettsiae in the Chick Embryo," p. 67, published by His Majesty's Stationery Office, London, 1946.

Schultz: J. A. M. A., 1075–1081, April 24, 1948.